United States Patent
Kim et al.

(10) Patent No.: US 9,628,828 B2
(45) Date of Patent: Apr. 18, 2017

(54) SOFTWARE DEFINED NETWORKING IN A CABLE TV SYSTEM

(71) Applicant: Cable Television Laboratories, Inc., Louisville, CO (US)

(72) Inventors: James Kim, Louisville, CO (US); Karthik Sundaresan, Louisville, CO (US); Thomas Kee, Louisville, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 0 days.

(21) Appl. No.: 14/970,004

(22) Filed: Dec. 15, 2015

(65) Prior Publication Data

US 2016/0191955 A1    Jun. 30, 2016

Related U.S. Application Data

(60) Provisional application No. 62/091,954, filed on Dec. 15, 2014.

(51) Int. Cl.

| | |
|---|---|
| *H04N 7/173* | (2011.01) |
| *H04N 21/231* | (2011.01) |
| *H04N 21/643* | (2011.01) |
| *H04N 21/238* | (2011.01) |
| *H04N 21/24* | (2011.01) |
| *H04N 21/61* | (2011.01) |
| *H04N 21/241* | (2011.01) |
| *H04N 21/2385* | (2011.01) |

(52) U.S. Cl.
CPC ..... *H04N 21/23103* (2013.01); *H04N 21/238* (2013.01); *H04N 21/2402* (2013.01); *H04N 21/6118* (2013.01); *H04N 21/643* (2013.01); *H04N 21/2385* (2013.01); *H04N 21/241* (2013.01)

(58) Field of Classification Search
CPC ........... H04N 21/23103; H04N 21/241; H04N 21/2385
USPC ........................................ 725/106, 107, 109
See application file for complete search history.

(56) References Cited

U.S. PATENT DOCUMENTS

| | | | |
|---|---|---|---|
| 8,935,726 B2 * | 1/2015 | Patel | ............................... 725/37 |
| 9,131,255 B2 * | 9/2015 | Smith | |

(Continued)

*Primary Examiner* — Pankaj Kumar
*Assistant Examiner* — Sahar Baig
(74) *Attorney, Agent, or Firm* — Duft Bornsen & Fettig; Gregory T. Fettig

(57) ABSTRACT

Systems and methods presented herein provide for a software defined network (SDN) controller in a cable television system that virtualizes network elements in the cable television system to provide content delivery and data services through the virtualized network elements. In one embodiment, the SDN controller is operable in a cloud computing environment to balance data traffic through the virtualized network elements. For example, the SDN controller may process a request for content from a user equipment (UE), determine a bandwidth capability of the UE, determine that bandwidth of the requested content exceeds the bandwidth capability of the UE, analyze the bandwidth capacity of the network elements, generate a virtual channel through the network elements based on the bandwidth capacity of the network elements, and to deliver the content to the UE through the virtualized channel.

6 Claims, 7 Drawing Sheets

(56) References Cited

U.S. PATENT DOCUMENTS

| | | | | |
|---|---|---|---|---|
| 9,325,597 | B1* | 4/2016 | Clasen | H04L 43/0882 |
| 2002/0054087 | A1* | 5/2002 | Noll | G06Q 30/02 |
| | | | | 715/744 |
| 2005/0281197 | A1* | 12/2005 | Honda | H04L 12/4641 |
| | | | | 370/235 |
| 2009/0265443 | A1* | 10/2009 | Moribe | G06F 15/16 |
| | | | | 709/217 |
| 2013/0346541 | A1* | 12/2013 | Codavalli | H04N 21/2747 |
| | | | | 709/217 |
| 2015/0271268 | A1* | 9/2015 | Finkelstein | H04L 67/12 |
| | | | | 370/400 |
| 2015/0350102 | A1* | 12/2015 | Leon-Garcia | H04L 41/12 |
| | | | | 709/226 |

* cited by examiner

SOFTWARE DEFINED NETWORKING IN A CABLE TV SYSTEM

This patent application claims priority to, and thus the benefit of an earlier filing date from, U.S. Provisional Patent Application No. 62/091,954 (filed Dec. 15, 2014), the entire contents of which are hereby incorporated by reference.

BACKGROUND

Cable television systems employ a network of devices (e.g., network elements) for delivering television programming to paying subscribers, typically by way of radio frequency (RF) signals transmitted through coaxial cables and/or light pulses through fiber-optic cables. Other services provided by cable television systems include high-speed Internet, home security, and telephone. Multiple television channels are distributed to subscriber residences from a "headend". Typically, each television channel is translated to a different frequency at the headend, giving each channel a different frequency "slot" so that the television signals do not interfere with one another. At the subscriber's residence, a desired channel is selected with the user's equipment (e.g., a cable modem (CM), a set-top box, a television, a computer, etc., collectively referred to herein as "user equipment", or UE) and displayed on a screen. These are referred to as the "downstream" channels in a cable television system. "Upstream" channels in the system send data from the UE to the headend for various reasons including pay-per-view requests, Internet uploads, and cable telephone service.

With the various forms of UEs, device protocols, content deliveries, and networks, data control has become exceptionally complex and difficult. For example, coordinating content deliveries from multiple independently operating network elements to an individual UE in a cable television network creates multiple layers of messaging and unbalanced traffic flows which can congest portions of the network.

SUMMARY

Systems and methods presented herein provide a software defined network (SDN) controller in a cable television system that virtualizes network elements in the cable television system and provides content delivery and data services through the virtualized network elements. In one embodiment, the SDN controller is operable in a cloud computing environment to balance data traffic through the virtualized network elements. For example, the SDN controller may process a request for content from a UE, determine a bandwidth capability of the UE, determine that bandwidth of the requested content exceeds the bandwidth capability of the UE, analyze the bandwidth capacity of the network elements, generate a virtual channel through the network elements based on the bandwidth capacity of the network elements, and to deliver the content to the UE through the virtualized channel.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
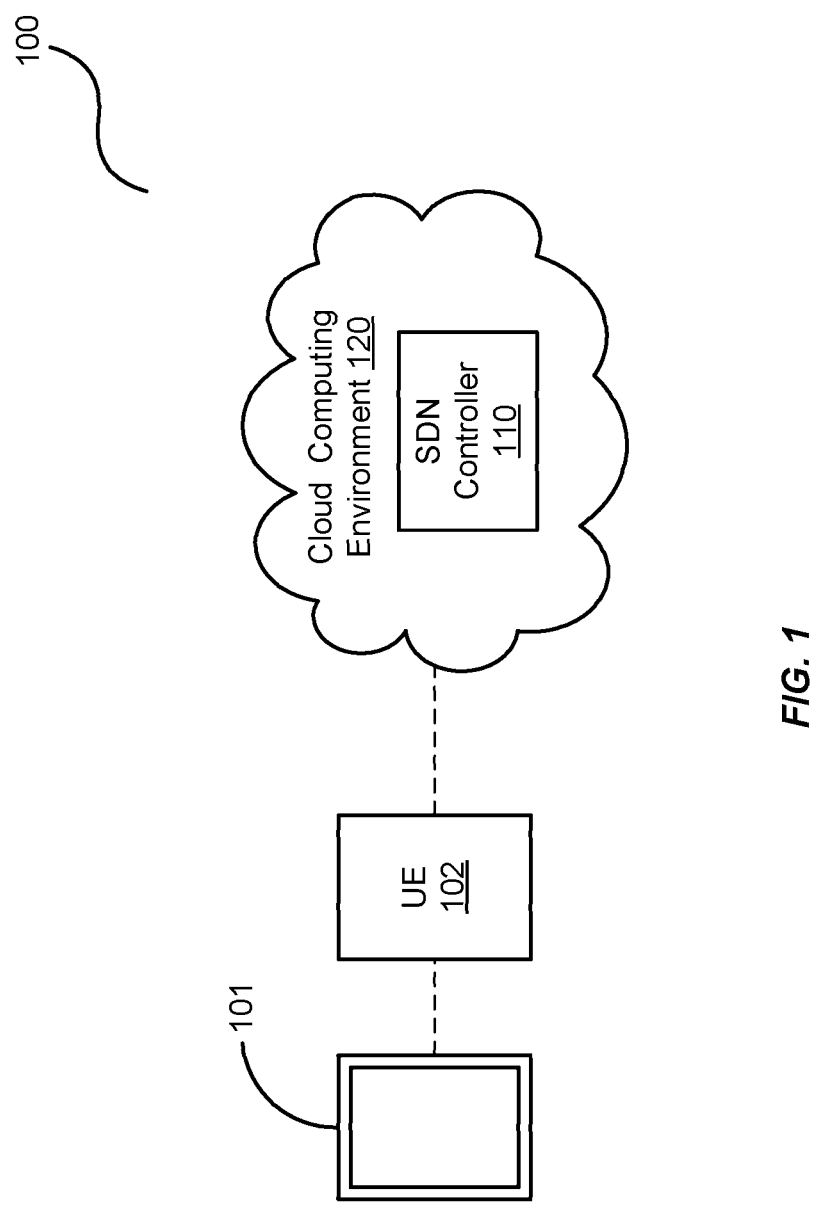
FIG. 1 is a block diagram of an exemplary cable television system employing a software defined network (SDN) controller.

FIG. 1 is a block diagram of a cable television system 100 employing a software defined network (SDN) controller 110 in a cloud computing environment 120. The SDN controller 110 allows a cable television network to manage its network services through the abstraction of higher-level functionality. In this regard, the SDN controller 110 decouples decisions regarding where traffic is sent by virtualizing network elements and storage infrastructure of the cable television system 100. As such, the SDN controller 110 can "shape" and balance the data traffic associated with content deliveries and other services for a subscriber's UE 102 and end device 101 (e.g., a tablet computer, the computer, a cell phone, television, etc.). This allows the cable television system 100 to manage data traffic from a centralized control console in the cloud computing environment 120.

Figure 2:
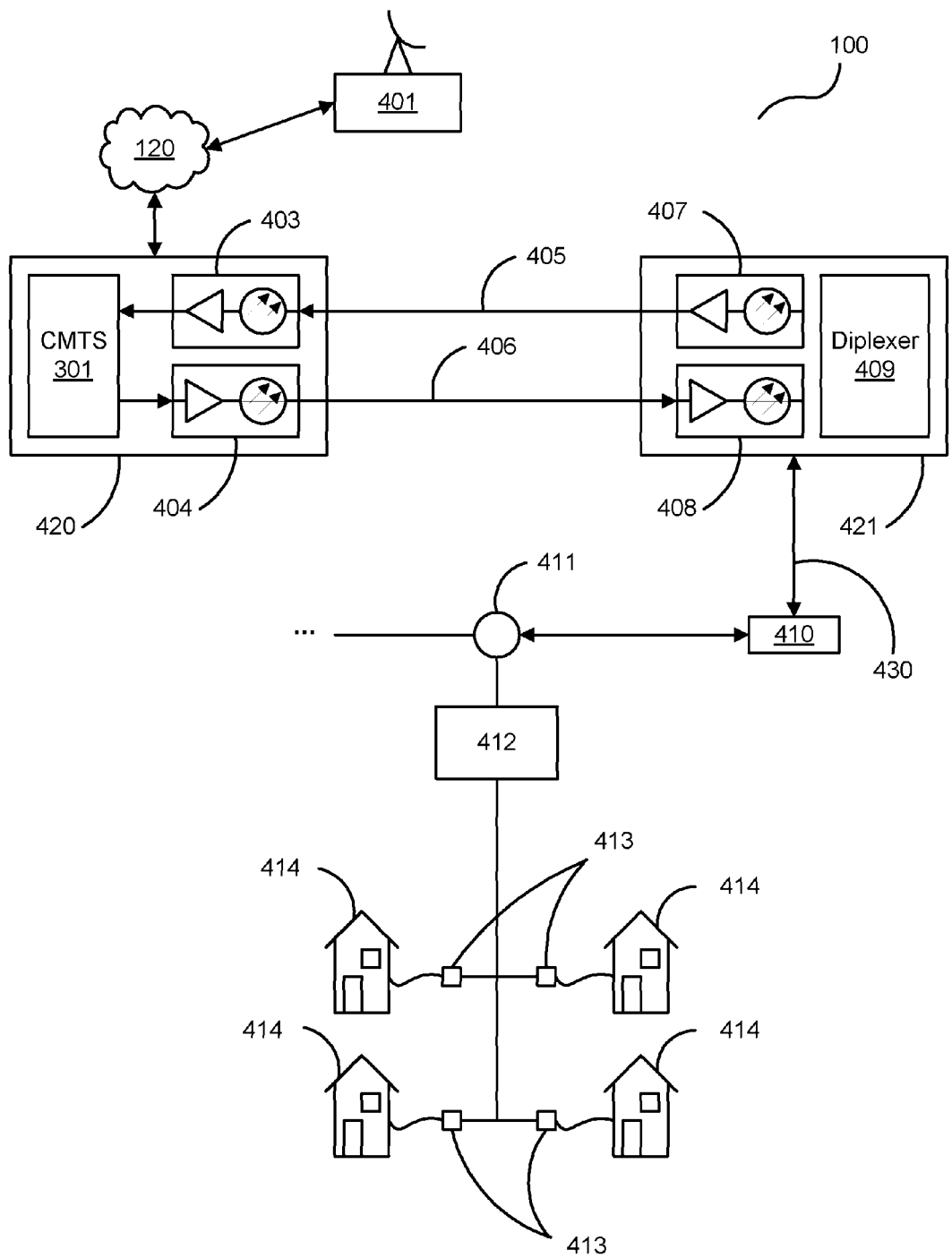
FIG. 2 is a more detailed block diagram of a cable television system.

FIG. 2 is a more detailed block diagram of the cable television system 100. The SDN controller 110 of the cloud computing environment 120 is generally configured proximate to an upstream hub 420 of the cable television system 100. The hub 420 includes a Cable Modem Termination System (CMTS) 301, an electrical to optical converter 403, and an optical to electrical converter 404. The hub 420 provides television programming and the high speed data services to subscribers of the cable television system 100. For example, antennas at a headend 401 may receive television signals that are converted as necessary and transmitted to the hub 420 through a plurality of virtualized network elements in the cloud computing environment 120 controlled by the SDN controller 110. The cloud computing environment 120 may also be coupled to an Internet backbone to provide Internet and other data services to the subscribers through the hub 420.

An upstream link of the cable television communication system 100 may provide the high speed data services being delivered over devices conforming to the Data Over Cable Service Interface Specification (DOCSIS) specification. The hub 420 is coupled to a downstream node 421 via optical communication links 405 and 406. The node 421 is similarly configured with an optical to electrical converter 408 and an electrical to optical converter 407.

Several hubs may be connected to a single headend 401 and the hub 420 may be connected to several nodes 421 by fiber optic cable links 405 and 406. The CMTS 301 may be configured in the headend 401 or in the hub 420. The fiber optic links 405 and 406 are typically driven by laser diodes, such as Fabry Perot and distributed feedback laser diodes.

Downstream, in homes and businesses are CMs (i.e., UEs 102, not shown). The CM acts as a host for an Internet Protocol (IP) device such as personal computer. Transmissions from the CMTS 301 to the CM are carried over the downstream portion of the cable television communication system generally from 54 to 860 MHz. Downstream digital transmissions are continuous and are typically monitored by many CMs. Upstream transmissions from the CMs to the CMTS 301 are typically carried in the 5-42 MHz frequency band, the upstream bandwidth being shared by the CMs that are on-line. However, with greater demands for data, additional frequency bands and bandwidths are continuously being considered and tested, including those frequency bands used in the downstream paths.

The CMTS 301 connects the local CM network to the Internet backbone. The CMTS 301 connects to the downstream path through the electrical to optical converter 404 that is connected to the fiber optic cable 406, which in turn, is connected to the optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other larger bands are being considered to provide increased capacity.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ any level of QAM, including 8 QAM, 32 QAM, 64 QAM, 128 QAM, and 256 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Transmissions, in this embodiment, are typically sent in a frequency/time division multiplexing access (FDMA/TDMA) scheme, as specified in the DOCSIS standards. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420.

Figure 3:
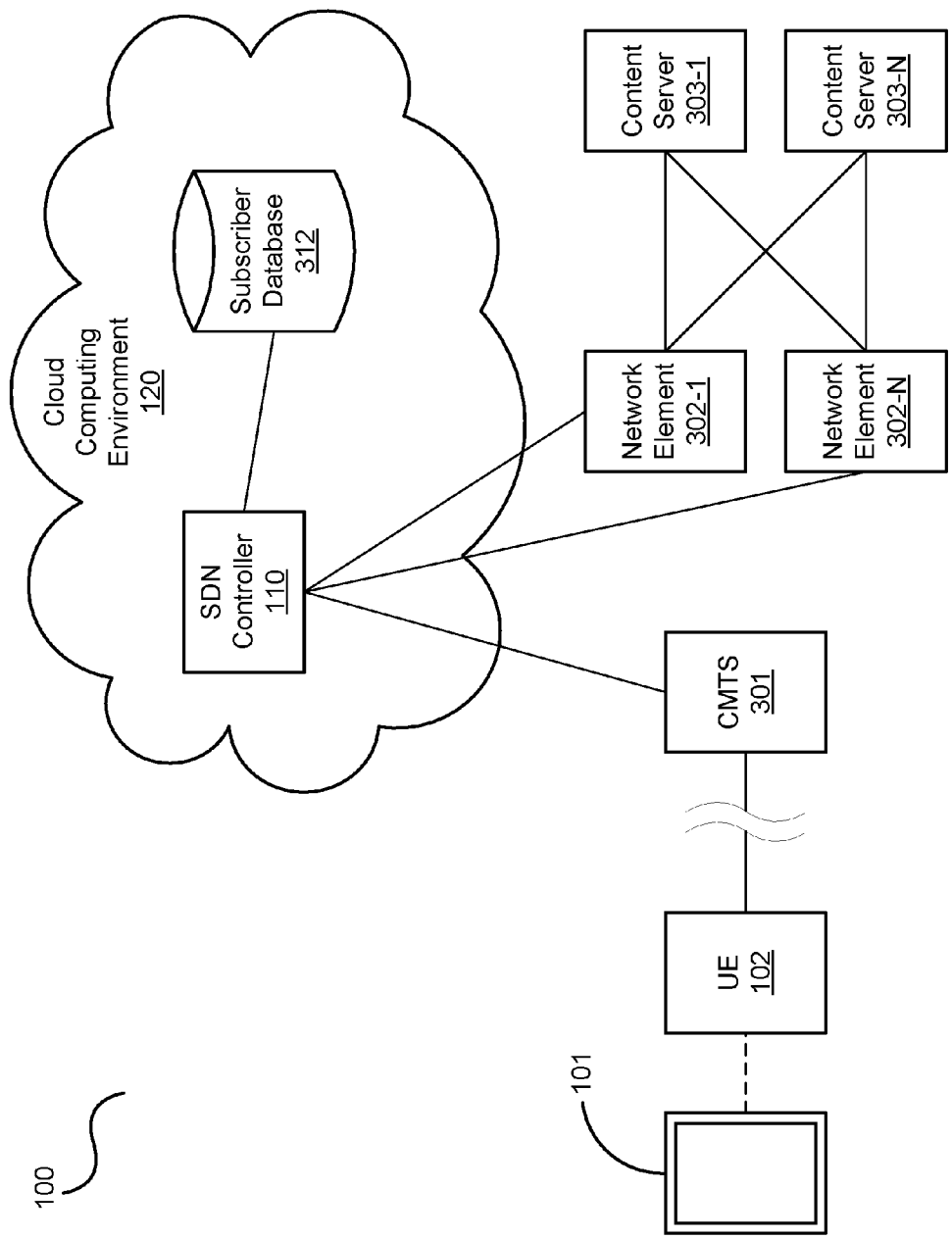
FIG. 3 is a block diagram of the SDN controller virtualizing a plurality of network elements in the cable television system.

FIG. 3 is a block diagram of the SDN controller 110 virtualizing a plurality of network elements 302-1-302-N in the cable television system 100 (where the reference "N" merely indicates an integer greater than "1" and not necessarily equal to any other "N" reference designated herein). In this embodiment, the network elements 302 are communicatively coupled to a plurality of content servers 303-1-303-N. The content servers 303 store content to be consumed by subscribers of the cable television system 100. For example, the content servers 303 may store movies, television shows, advertisements, and the like that a subscriber can view through their UEs 102 and/or end devices 101. The UEs 102 are communicatively coupled to the CMTS 301 as shown and described in FIG. 2.

The SDN controller 110 virtualizes the network elements 302 and balances the traffic associated with the content being delivered from the content servers 303 through the virtualized network elements 302. For example, when a subscriber requests certain content, the SDN controller 110 having full network topology identifies a path from the content servers 303 to the UE 102 through the network elements 302. The SDN controller 110 determines the bandwidth capabilities of the content and the network elements 302 to identify a data path for the content to the UE 102. Thus, the SDN controller 110 is any combination of device(s) and software operable within a cloud computing environment 120 to virtualize network elements in a cable television system for the purposes of controlling traffic in the cable television system.

Subscribers may have varying degrees of quality of Service (QoS) associated with their cable television subscriptions. For example, some subscribers may pay more for a higher data rate than other subscribers. When a higher QoS subscriber requires content and the bandwidth is not necessarily available through a particular network element path, the SDN controller 110 determines current capacities of the network elements 302 and forms a virtual path through the network elements.

To illustrate, assume that the network element 302-1 has a bandwidth capability of 100 Mbps (Megabits per second) and that the network element 302-N also has a bandwidth capability of 100 Mbps. However, current capacity demands on the network elements 302-1 and 302-N may be at 70 Mbps and 30 Mbps, respectively. Thus, when a subscriber having a higher QoS request content delivery at 100 Mbps from say content server 303-1, the network elements 302-1 and 302-N are incapable of delivering that content to the subscriber's UE 102. The SDN controller 110 obtains the 100 Mbps from the network elements 302-1 and 302-N by using the remaining 30 Mbps of the network element 302-1 and the remaining 70 Mbps of the network element 302-N and combining that capacity into a virtual path from the content server 303-1 to the UE 102. Once the content is delivered to the higher QoS subscriber and the demand for bandwidth has subsided, the SDN controller 110 on each of the network elements 302 used to build the path.

The SDN controller 110 may store this and other information within a subscriber database 312. For example, if a lower QoS subscriber exceeds an amount of data delivered in a certain time period, the SDN controller 110 may track that data is stored in the subscriber database 312 such that the MSO can bill accordingly.

Figure 4:
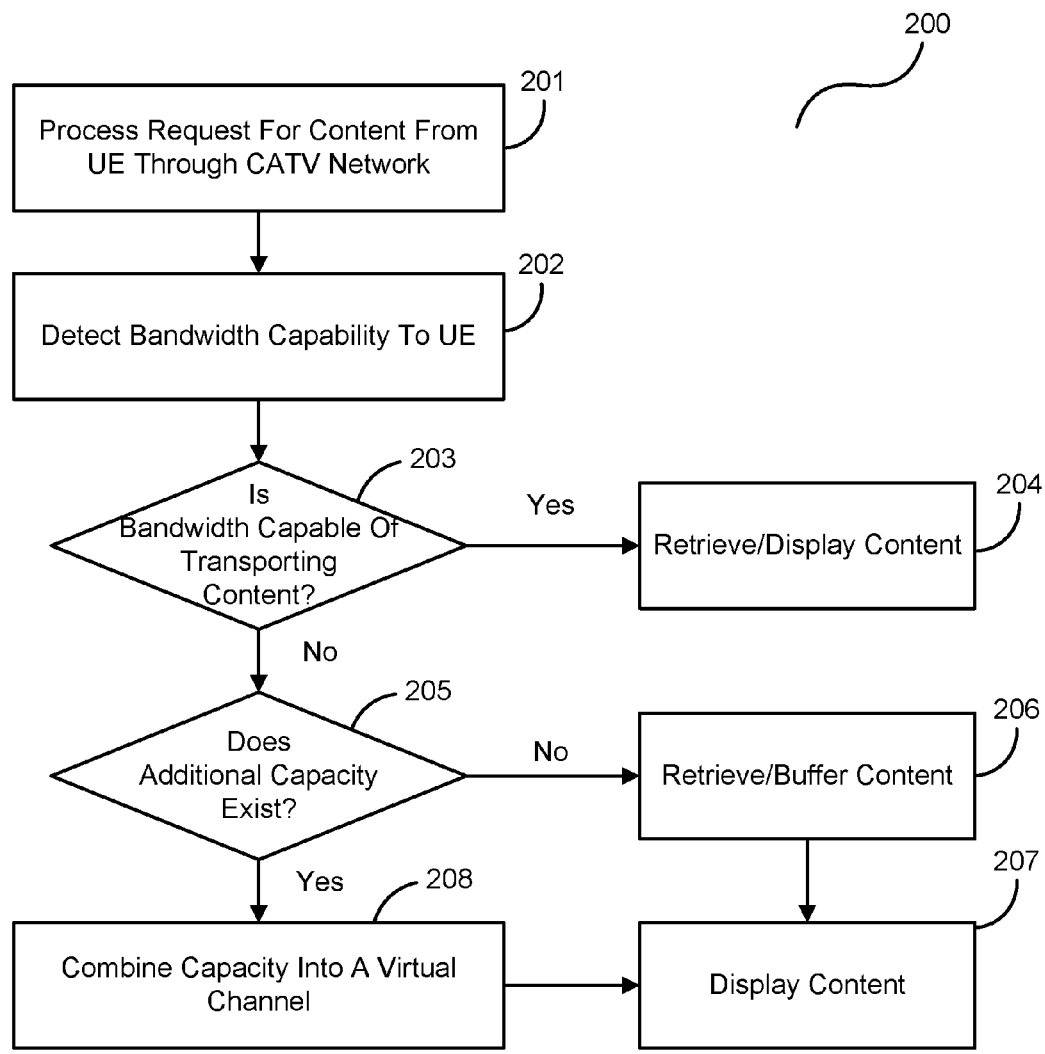
FIG. 4 is a flowchart illustrating an exemplary process of the SDN controller.

FIG. 4 is a flowchart illustrating an exemplary process 200 of the SDN controller 110. In this embodiment, the SDN controller 110 receives and processes request for content from the UE 102 through the cable television network (CATV), in the process element 201. The SDN controller 110 then detects a bandwidth capability to the subscriber's UE 102, in the process element 202. If the bandwidth through a particular network element 302 is capable of delivering the content from the content server(s) 303 through the network element 302, then the SDN controller 110 retrieves the content from the content server(s) 303, in the process element 204, or transfer and display on the users UE 102. This may be done regardless of the subscriber's QoS. For example, a subscriber with a lower QoS may attempt to retrieve content from the cable television system 100 at night when demands on capacity are less. Accordingly, the SDN controller 110 may recognize this and simply provide the content to the subscriber.

If the bandwidth does not exist on a particular network element, the SDN controller 110 looks at other network elements 302 within the cable television system 100 to determine if additional capacity exists there, in the process element 205. If capacity does among other network elements 302, the SDN controller 110 combines the capacity into a virtual channel, in the process element 208, to deliver the content to the subscribers UE 102. Thereafter, the subscriber may display the content, in the process element 207.

If additional capacity does not exist among other network elements to support the content delivery, then the SDN controller 110 may retrieve the content and buffer it, in the process element 206. For example, assume that a requested form of content requires a 100 Mbps data transfer rate for real-time transfer. And assume that only a 50 Mbps data transfer rate exists, virtual or otherwise. The SDN controller 110 buffers the content for later delivery by determining an amount of data in the requested content and the amount of time it would take for a 50 Mbps transfer rate to accumulate that much data. The SDN controller 110 may then deliver that content to the UE 102 and inform the UE 102 to not display the content until at least a predetermined buffered amount has been accumulated.

The SDN controller 110 may also monitor the capacity of the network elements 302 and make adjustments accordingly. In other words, if the capacity does not exist to provide the requested content, then the SDN controller 110 may buffer the data of the requested content and monitor when capacity comes available to adjust the data transfer rate and/or form a virtual path through the network elements 302.

Figure 5:
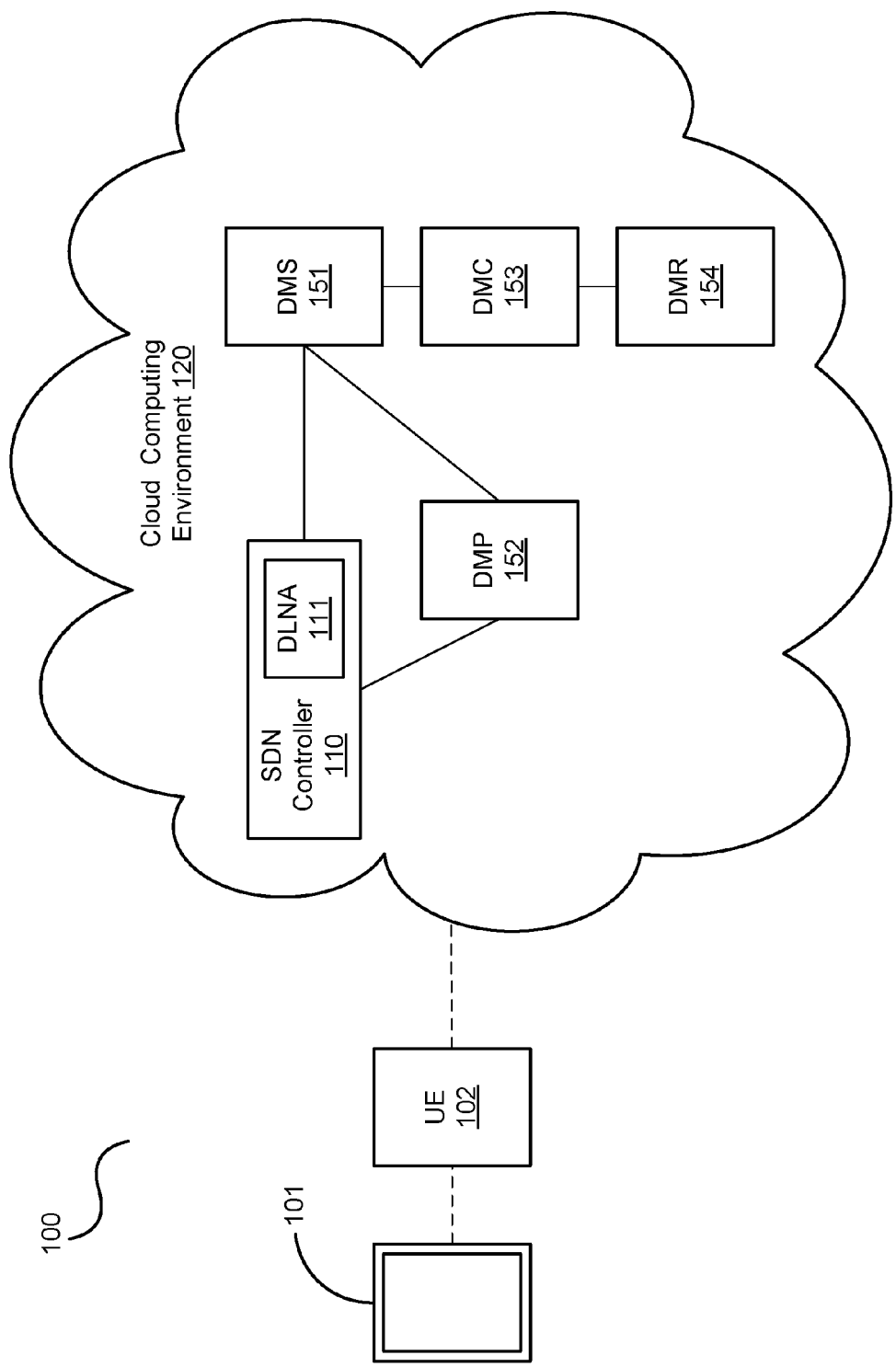
FIG. 5 is a block diagram of an exemplary SDN controller operating within a cloud computing environment with Digital Living Network Alliance (DLNA) components.

FIG. 5 is a block diagram of an exemplary SDN controller 110 operating within the cloud computing environment 120 with various DLNA components, such as the digital Media Server (DMS) 151, the digital media player (DMP) 152, the digital media renderer (DMR) 154, and the digital media controller (DMC) 153. DLNA provides a standardized manner in which devices can communicate with one another within a network, such as the cloud computing environment 120.

The DMS 151 stores content and makes it available to the DMP 152 and the DMR 154. The DMS 151 can be implemented in a variety of devices including network attached storage devices, computers, and gaming consoles. The DMP 152 can locate content on the DMS 151 and provide playback and rendering capabilities. The DMR 154 plays content as instructed by the DMC 153. The DMC 153 can also locate content on the DMS 151 and instruct the DMR 154 to play that content.

The DMS 151, the DMP 152, the DMC 153, the DMR 154 are illustrated as being configured within the cloud computing environment 120. However, these components are not necessarily part of a cable television cloud computing environment. Rather, they may be part of or interface with a cable television system to provide a network environment to a cable television subscriber.

As mentioned, DLNA provides a standardized communication protocol for devices. However, some subscribers may have devices that are not operable to communicate with the deal on a protocol. As an example, assume that the UE 102 is not configured to communicate according to the DLNA protocol. The SDN controller 110 comprises DLNA protocol module that is operable to interface with each of the DLNA components (i.e., the DMS 151, the DMP 152, the DMC 153, and the DMR 154). Thus, the UE 102 may be operable to communicate to the SDN controller 110 and operate each of the DLNA components to retrieve and display content. The SDN controller 110 thereby acts as a protocol converter between the DLNA and the UE 102.

The SDN controller 110 also provides discovering control when the noncompatible UE 102 is communicatively coupled to the cloud computing environment 120. For example, when the UE 102 is detected by the cloud computing environment 120, the UE 102 may advertise its capabilities to a multicast address of 239.255.255.250:6633. The SDN controller 110 is operable to "listen" for the UE 102 using the universal plug-and-play architecture.

Figure 6:
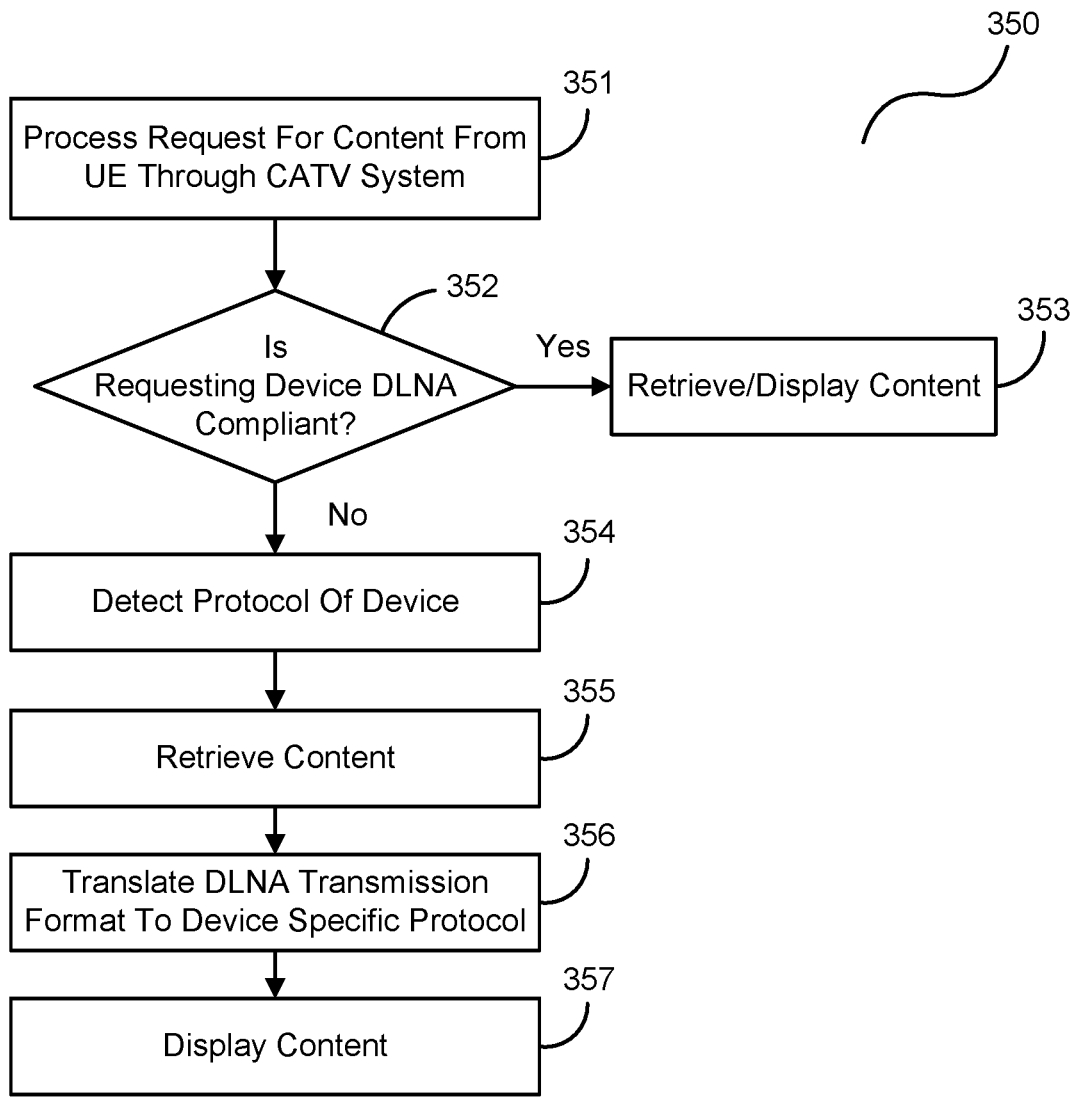
FIG. 6 is a flowchart illustrating another exemplary process of the SDN controller.

FIG. 6 is a flowchart illustrating another exemplary process 350 of the SDN controller 110. In this embodiment, the SDN controller 110 may process a request for content from the UE 102 through cable television system 100, in the process element 351. The SDN controller 110 then determines if the requesting device is DLNA compliant, in the process element 352. If so, the SDN controller 110 retrieves and displays the content, in the process element 353. For example, the SDN controller 110 may provide direct access to the DLNA components (i.e., the DMS 151, the DMP 152, the DMC 153, and the DMR 154) such that the UE 102 can control those components.

If the UE 102 is not DLNA compliant, then the SDN controller 110 detects a protocol or other communication means of the UE 102, in the process element 354. The SDN controller 110 then retrieves the content (e.g., from the DMS 151), in the process element 355 four display via the UE 102. In this regard, the SDN controller 110 translates control functionality of the UE 102 such that it can operate the DLNA components to retrieve the desired content as though it were a DLNA compliant device. Thus, the SDN controller 110 they translate the DLNA transmission format of the content to the device specific protocol, in the process element 356, such that the content can be displayed, in the process element 357, with the UE 102.

Figure 7:
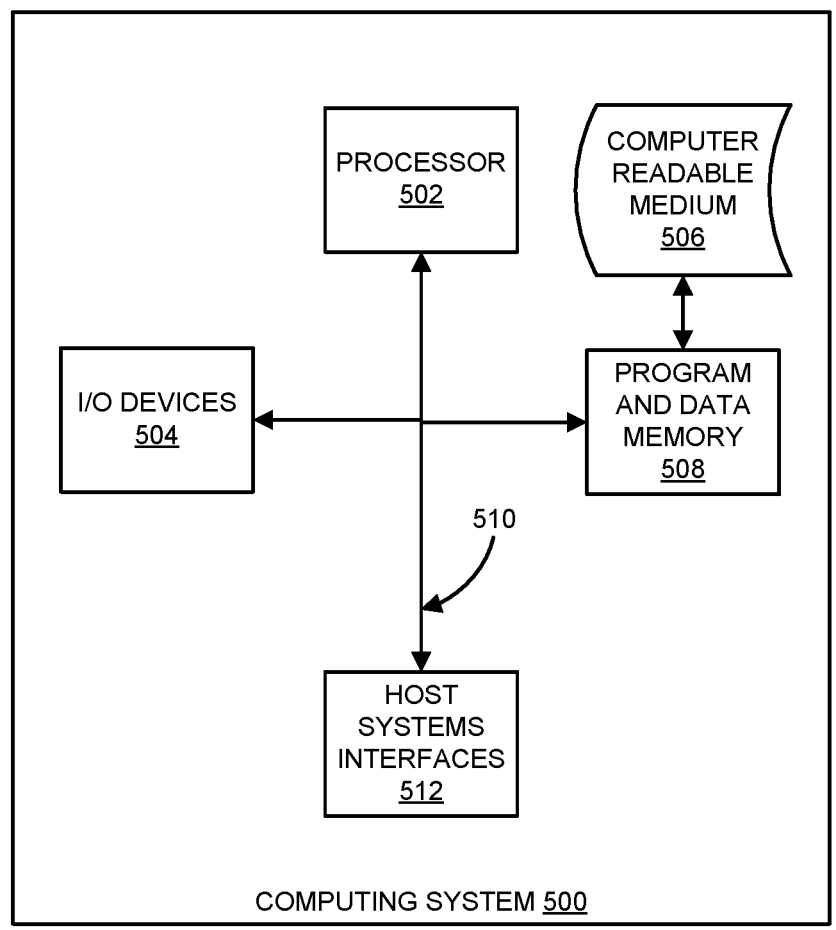
FIG. 7 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 7 illustrates a computing system 500 in which a computer readable medium 506 may provide instructions for performing any of the methods disclosed herein. For example the computer readable medium 506 may provide program code for use by or in connection with a computer or any instruction execution system to perform the methods disclosed herein. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A cable television system, comprising:
a cable modem termination system (CMTS) operable to deliver content and data services to a plurality of subscribers of the cable television system;
a plurality of network elements operable to deliver the content to the CMTS; and
a software defined network (SDN) controller operable within a cloud computing environment that is communicatively coupled to the CMTS,
wherein the SDN controller is operable to virtualize the network elements in the cloud computing environment to balance data traffic through the virtualized network elements,
wherein the SDN controller is further operable to process a request for content from a user equipment (UE), to determine a bandwidth capability to the UE, to determine that bandwidth of the requested content exceeds the bandwidth capability to the UE, to analyze the bandwidth capacity of the network elements, to generate a virtual channel through the network elements based on the bandwidth capacity of the network elements, and to deliver the content to the UE through the virtualized channel.

2. The cable television system of claim 1, wherein:
the SDN controller is operable to determine if the UE is a Digital Living Network Alliance (DLNA) compliant device.

3. A method operable in a cable television system, the method comprising:
operating a software defined network (SDN) controller within a cloud computing environment, wherein the SDN controller is communicatively coupled to a cable modem termination system (CMTS) operable to deliver content and data services to a plurality of subscribers of the cable television system;
virtualizing a plurality of network elements of the cable television system in the cloud computing environment via the SDN controller to balance data traffic through the virtualized network elements;
processing a request for content from a user equipment (UE);
determining a bandwidth capability to the UE;
determining that bandwidth of the requested content exceeds the bandwidth capability to the UE;
analyzing the bandwidth capacity of the network elements;
generating a virtual channel through the network elements based on the bandwidth capacity of the network elements; and
delivering the content to the UE through the virtualized channel.

4. The method of claim 3, wherein:
the SDN controller is operable to determine if the UE is a Digital Living Network Alliance (DLNA) compliant device.

5. A non-transitory computer readable medium comprising instructions that, when directed by a processor in the cable television system, direct the processor to:
operate a software defined network (SDN) controller within a cloud computing environment, wherein the SDN controller is communicatively coupled to a cable modem termination system (CMTS) operable to deliver content and data services to a plurality of subscribers of the cable television system;
virtualize a plurality of network elements of the cable television system in the cloud computing environment via the SDN controller to balance data traffic through the virtualized network elements;
process a request for content from a user equipment (UE);
determine a bandwidth capability to the UE;
determine that bandwidth of the requested content exceeds the bandwidth capability to the UE;
analyze the bandwidth capacity of the network elements;
generate a virtual channel through the network elements based on the bandwidth capacity of the network elements; and
deliver the content to the UE through the virtualized channel.

6. The computer readable medium of claim 5, wherein:
the SDN controller is operable to determine if the UE is a Digital Living Network Alliance (DLNA) compliant device.

* * * * *